Patented May 9, 1950

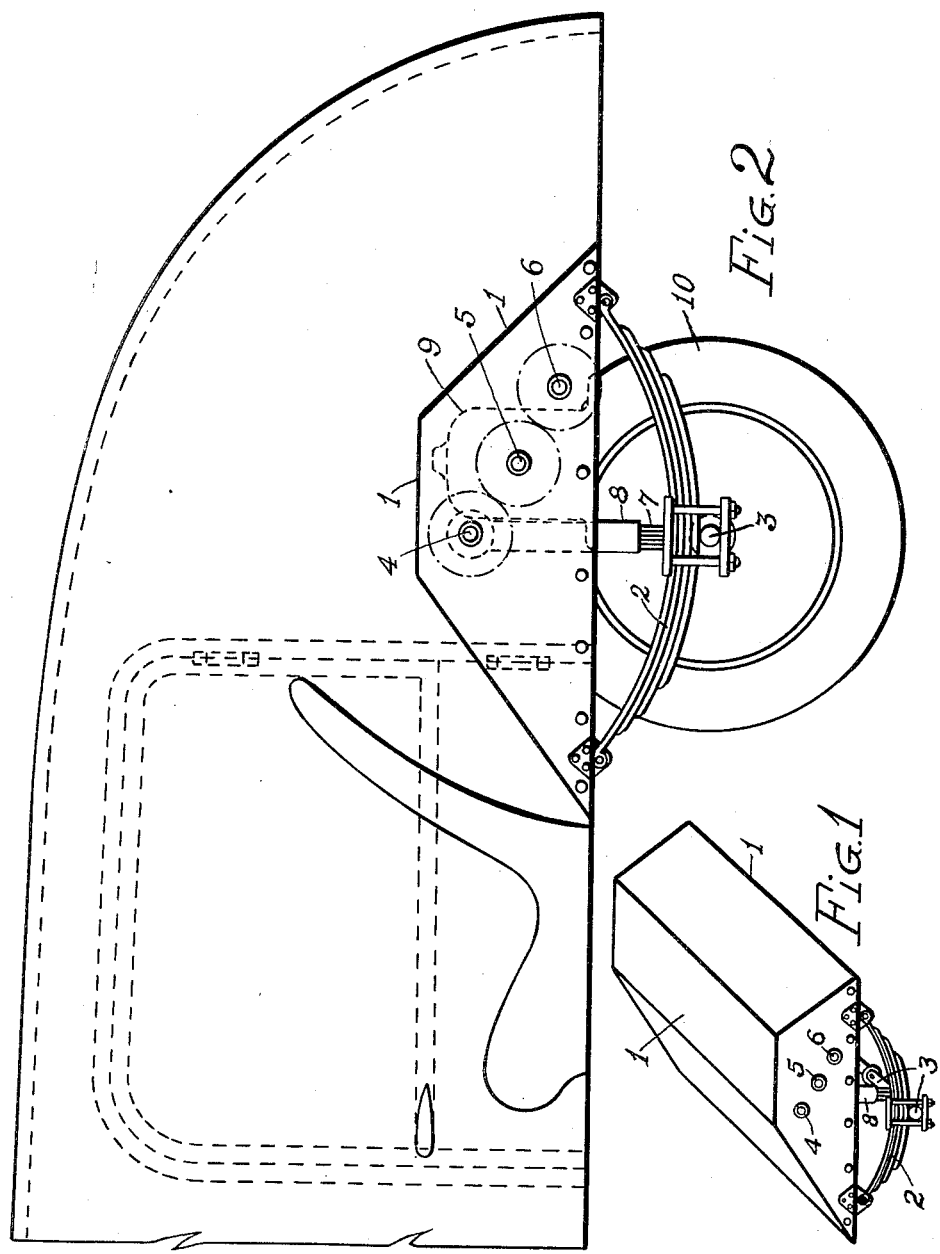

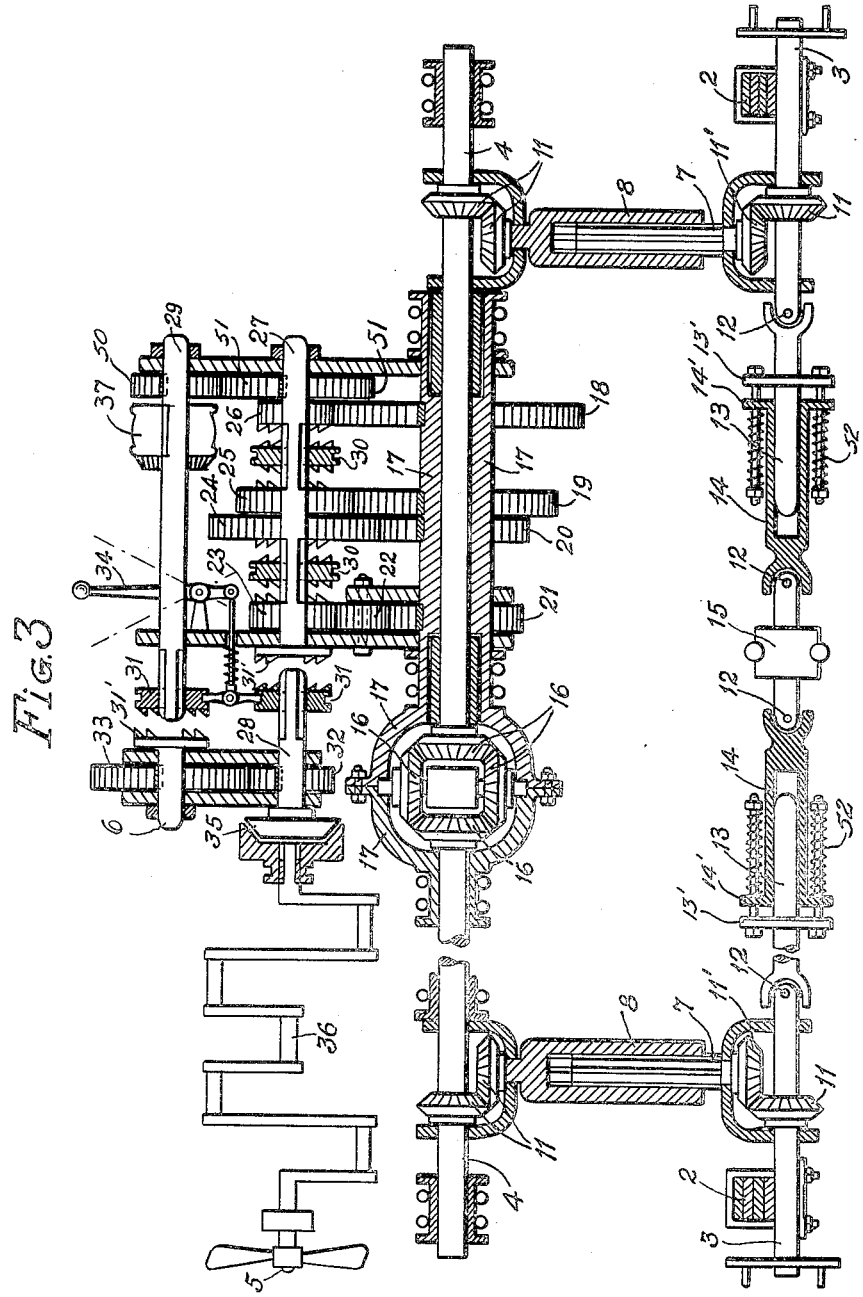

2,506,999

UNITED STATES PATENT OFFICE 2,506,999

TRANSMISSION UNIT FOR MOTOR VEHICLES

Manuel Benito de la Rosa and Delina Clavijo Garcia, Habana, Cuba

Application December 23, 1946, Serial No. 718,078
In Cuba January 15, 1946

2 Claims. (Cl. 180—73)

This invention relates to a transmission unit for motor vehicles and an object of the invention is to provide an improved transmission unit which will improve and simplify both the structure and body as well as the assembly of motor vehicles.

Taking into account that horsepower increase in motors is not what we are really concerned with, the present invention has the advantage that it renders operation with 15 H. P. sufficient, the power projection at a distance is eliminated and the motor, the transmission, speed reduction device, retransmissions and integral and pendular suspension forming the transmission unit are all assembled in a small structure, frame and casing adapted to be easily and rapidly attached to and detached from the body.

A further advantage of the invention is that a more select running is obtained through the use of pendular wheels that represent isolated and independent points of contact upon the pavement and that are free from the usual strong tension by tube axles and differential casing. Rigid couplings are avoided. Each wheel fully absorbs shocks caused by road irregularities. A wheel may jump over an obstacle on the road while the opposed wheel gets into a hole, yet, no violent blows or inclinations will take place.

A still further advantage of the invention is that without exposure to the failures or deficiencies that are common to devices, such as hydraulic and fluid speed gears, etc., it is possible to obtain the maximum speed that tires can resist, with absolute control, and where going up a hill or a heavy load requires a maximum development of power by the motor, the operation is consolidated by a speed reduction equipment that simplifies and improves the equipments or systems at present in use.

Further advantages of the invention will be apparent from the description that follows.

The invention is described with reference to the figures of the accompanying drawings, in which:

Fig. 1 is a perspective view of the chassis and transmission casing of an automobile as viewed from top to bottom, showing a detailed view of one side thereof.

Fig. 2 is a side view of the latter structure indicating its position in the automobile body.

Fig. 3 is a diagrammatical vertical view in longitudinal section, to better illustrate the parts and devices forming our equipment.

Referring to Fig. 1 the transmission casing 1 is mounted in the lower portion of the body and a spring 2 is secured thereto having fixed thereto a bearing clamp for the axle 3. At 4, 5 and 6 are indicated shaft ends.

The vertically slidable stem 7 is received in the hollow shaft 8 and is slidably but non-rotatably mounted therein.

The motor is indicated generally at 9 and a vehicle wheel is shown at 10.

In Fig. 3, the numbers 11 and 11' indicate sets of cooperating bevel gears. At 12 the universal joint connections are shown and a slidable shaft 13 slides in a hollow shaft 14. The hollow shaft 14 has a flange 14' and the shaft 13 a flange 13' and the flanges 13' and 14' are interconnected by spring encircled bolts 52. The central section 15 is secured to the frame of the vehicle by a support in any desired manner. The two shaft extensions from the inner joints 12 are adapted to be rotatably mounted in the section 15.

The bevel pinions 16 forming the differential are enclosed in a hollow transmission shaft 17 which surrounds and causes the entire differential to rotate. Gears 18, 19, 20 and 21 are fixedly mounted upon the shaft 17 for securing various speeds thereof. A reversing gear is shown at 22 and gears 23, 24, 25 and 26 cooperate with the fixed gears on shaft 17 for transmitting the speeds desired. A drive shaft 27 is mounted as an extension of the shaft 28.

A speed reduction counter shaft 29 is mounted as an extension of the shaft 6 and has fixed thereon a gear 50 meshing with a gear 51 fixed to shaft 27. Clutches 30 are mounted on the shaft 27 between the gears loosely mounted thereon so that the gear selected may be driven.

Clutch elements 31 and 31' are provided to cooperate with the speed reduction gearing. At 32 and 33 gears are shown which may coact when desired in the operation when speed reduction is desired. A lever 34 pivotally mounted as shown upon the framework operates the clutch elements 31 and 31'. A clutch 35 on the shaft 28 engages when put into operation the crank shaft 36 of an internal combustion engine. A pulley 37 is fixed on the shaft 29 and on one face thereof is provided with a bevel gear.

The operation of the transmission unit described above is as follows. When the crank shaft 36 rotates such rotation is transmitted to the clutch 35 and to the shaft 28. Then power may be transmitted through the clutch elements 31 and 31' either to the drive shaft 27 if a direct drive is desired or to the shaft 29 if a reduced drive is desired. Then by connecting one of the clutches 30 with the appropriate gear drive may be transmitted to the transmission shaft 17.

The shaft 17 will transmit the drive through the bevel gears 11 to the shafts 8 and from the latter the drive will be transmitted to the slidable shaft 7 and then by the cooperating bevel gears 11' to the axles 3 which drive the wheels 10 of the motor vehicle.

It is obvious that the drawings and the foregoing description are merely illustrative and not limitative, so that any person skilled in the art will be able to make changes in the construction details or arrangement of the parts without departing from the spirit of the invention which resides in the automotive unit as defined in the appended claims.

What we claim is:

1. A transmission unit for motor vehicles comprising a metallic frame on which the mechanism is mounted, said mechanism comprising a horizontal shaft, a clutch attached to the outer end thereof and a second clutch on the other end thereof, a second horizontal shaft in alignment with the first, said second shaft having mounted on it a series of loose gears and two double clutches attached in the spaces between said gears, a gear fixed to said second horizontal shaft near one end, a horizontal countershaft, a gear on said countershaft, a pinion mounted on said first horizontal shaft and meshing with said gear mounted on said countershaft, a clutch member attached to said last named gear, a second countershaft aligned with said first mentioned countershaft, a gear on said second countershaft, meshing with said gear fixed on said second named horizontal shaft, a hollow horizontal shaft containing a set of differential gears and two aligned shafts attached to said differential gears, gears fixed to said hollow horizontal shaft, said loose gears on said second horizontal shaft meshing with said fixed gears on said hollow horizontal shaft, said aligned shafts in said hollow shaft having each a bevel gear mounted some distance from its outer end, a vertical and partially hollow shaft supported from each horizontal aligned shaft, bevel gears on said vertical shafts, said bevel gears on said aligned shafts meshing with said bevel gears on said vertical shafts, solid vertical shafts slidingly but non-rotatively mounted in said vertical hollow shafts, a driving axle to which said solid vertical shafts are connected, said solid vertical shafts having each a bevel gear attached to the lower end thereof and bevel gears mounted on said driving axle meshing with said last named bevel gears.

2. The combination of a transmission unit for motor vehicles as set forth in claim 1, with the driving axle comprising five aligned sections connected by universal joints, the central section being supported from the frame of the vehicle, the two adjacent sections being composed each of two independent portions one partially hollow and possessing a flange at its hollow end and the other of lesser diameter having a flange located at some distance from its free end, and means uniting both of said flanges to provide an elastic joint between both portions of each of said sections.

MANUEL BENITO DE LA ROSA.
DELINA CLAVIJO GARCIA.

REFERENCES CITED

The following references are of record in the file of this patent:

UNITED STATES PATENTS

| Number | Name | Date |
| --- | --- | --- |
| 635,171 | Mathieu | Oct. 17, 1899 |
| 638,029 | Peck | Nov. 28, 1899 |
| 1,023,084 | Luitwieler | Apr. 9, 1912 |
| 1,119,225 | Bernheimer | Dec. 1, 1914 |
| 1,125,140 | Lucke | Jan. 19, 1915 |
| 1,708,511 | Lyford | Apr. 9, 1929 |
| 1,958,623 | Hermann | May 15, 1934 |
| 1,989,446 | Ganz | Jan. 29, 1935 |
| 2,123,005 | Ford | July 5, 1938 |
| 2,393,623 | Ehrenberg | Jan. 29, 1946 |